Patented Oct. 16, 1934

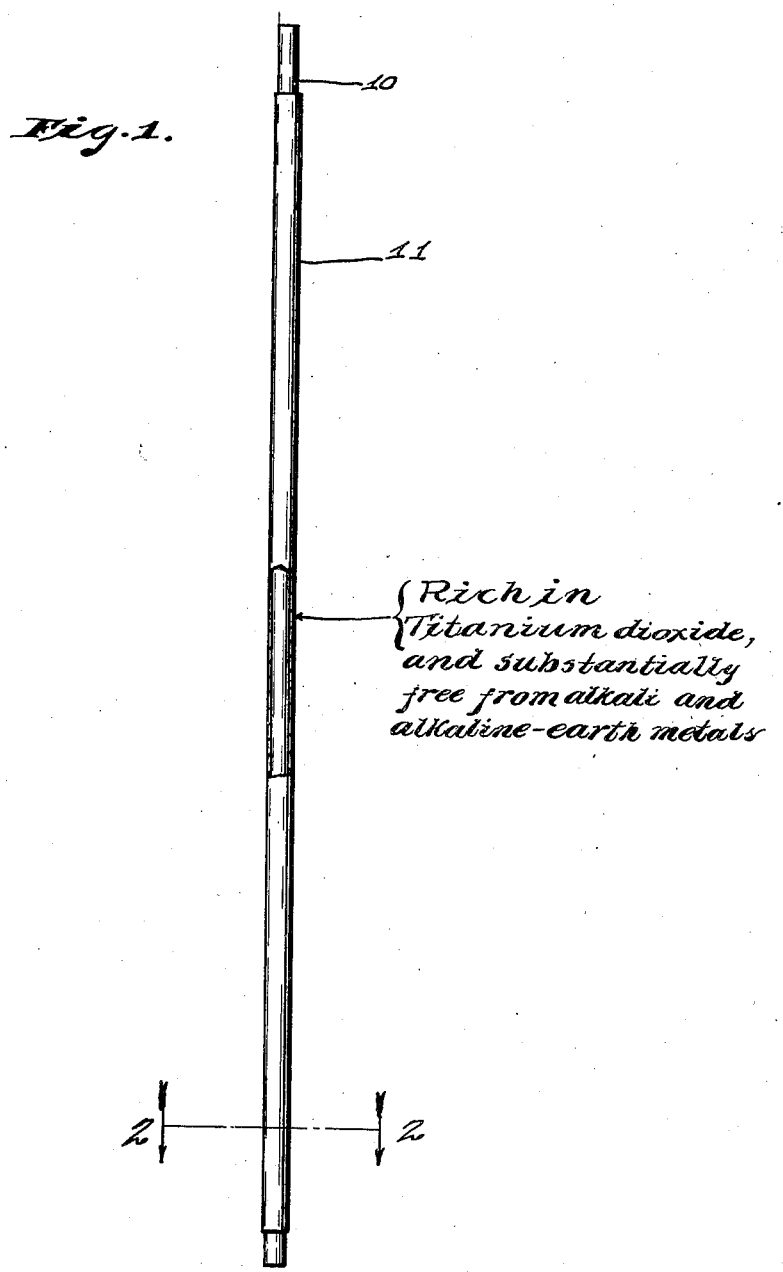

1,977,277

UNITED STATES PATENT OFFICE 1,977,277

COATED WELDING ELECTRODE

Paul R. Judy and Harry R. Pennington, Muncie, Ind., assignors to Indiana Steel & Wire Company, Muncie, Ind., a corporation of Indiana Application July 1, 1933, Serial No. 678,615

11 Claims. (Cl. 219—8)

It is the object of our invention to produce a welding electrode which has a high melting rate, so that the welding operation may be effected rapidly, and yet one which maintains a stable arc.

We have discovered that by making a welding electrode which has a coating, especially a thin coating, rich in titanium dioxide and substantially free from alkali metals and alkaline-earth metals, such as sodium and calcium, we are able to get these desired characteristics of fast melting and stability. By also avoiding, largely if not wholly, the iron oxides of the ordinary sull coating, even better results may be obtained.

The titanium dioxide may form the whole or any desired fraction of the coating, but for best results should be at least 30% of it, or more than that even up to 100%. The alkali metals and alkaline-earth metals are desirably completely absent; but where this is not wholly feasible they should certainly be present in insignificant amount in comparison to the titanium dioxide, and certainly not more than 10% by weight of the titanium dioxide.

The accompanying drawing shows a coated welding electrode embodying our invention: Fig. 1 is an elevation of such a coated welding electrode, partly broken away to show a longitudinal section; and Fig. 2 is a cross-section of such coated welding electrode, on the line 2—2 of Fig. 1.

In such drawing, the metallic wire or rod 10 is covered for all or the greater part of its length by a coating 11; which is rich in titanium dioxide, desirably containing 30% or more of it, and is substantially free from alkali metals and from alkaline-earth metals.

In the ordinary dry process of wire manufacture, the rods, after being cleaned by dipping in acid and rinsing in water, are coated with lime. Such lime-coated rods are usually baked to remove moisture and occluded hydrogen, and as a curing treatment. The lime retained on the rods serves as a part of the drawing lubricant, and persists in and on the surface throughout the drawing operation and in the finished wire. Sodium soap is usually also used at the dies as part of the drawing lubricant, and likewise persists in and on the surface in the finished wire.

In carrying out our invention, we either avoid the use of alkali-metal and alkaline-earth-metal compounds on the surface of the wire in the preliminary treatment of the rods and in drawing the wire, or else remove such compounds from the wire; and then apply a coating containing titanium dioxide.

Avoidance of the presence of these alkali metals and alkaline-earth metals in and on the surface of the wire may be obtained in various ways. For instance:

1. We may omit lime entirely on the rods from which the wire is drawn, both after the washing and in the drawing operation; and instead of the lime may use some organic material, such as wheat flour, as a pre-drawing coating. Then in dry-drawing wire from such meal-coated rods, we used as little soap as possible at the dies, so that there will be very little soap on the drawn wire. This wire is then coated with a material rich in titanium dioxide, to form our welding electrodes.

2. We may omit lime entirely on the rods from which the wire is drawn, as in No. 1 above, and put the rods immediately after cleaning into a suitable bath from which wire is wet-drawn in a usual manner. Various materials may be used in the bath, but desirably a material which is free from alkali metals, such as a soluble oil, for instance a sulphonated oil. The wet-drawn wire is then coated with material rich in titanium dioxide, to form our welding electrodes.

Instead of attempting to avoid the presence of alkali metals and alkaline-earth metals on the surface of the wire, we may remove the compounds containing those metals from the wire after the drawing operation which involved their use. Such removal may be obtained, for instance, by cleaning the drawn wire in acid, washing the wire, and then promptly coating the cleaned wire with a material rich in titanium dioxide.

The coating material rich in titanium dioxide which may be used may vary widely in any of these instances. For instance:

1. It may be pure titanium dioxide, made into a water suspension and applied to the wire in a thin coating. Upon evaporation of the water the titanium dioxide adheres fairly well to the surface of the wire. Such adherence may be increased by baking the coated electrode; and/or by passing the coated electrode through a straightening arbor, desirably with the titanium dioxide damp either from the original water or from added water.

2. Instead of using a mere suspension in water of titanium dioxide alone, however, we may have other material co-present with it; although we prefer that the titanium dioxide form at least 30% of the whole coating. For instance:

a. We may add gum arabic to the water suspension of titanium dioxide, to form a suspension of titanium dioxide in a solution of gum arabic.

The gum arabic not only promotes adhesion, by serving as a binder to hold the titanium dioxide to the surface of the wire, but also plays a part in shielding the arc by yielding gaseous oxides of carbon on being heated. The use of gum arabic in a coating for welding electrodes is the specific subject of a separate application by one of us, Harry R. Pennington, Serial No. 676,067, filed June 16, 1933.

b. We may have any desired or usual coating materials co-present, except those containing any substantial amount of alkali and alkaline-earth metals and desirably except iron oxides. For instance, we may have silicon, aluminum, manganese, carbon, boron, and/or compounds containing them, co-present with the titanium dioxide in the coating. These may, if desired, be in addition to the gum arabic.

When gum arabic is used, its ratio to the titanium dioxide may vary over a rather wide range. Thus we have found that satisfactory proportions for the coating mixture may be as follows:

Titanium dioxide_____ 8 to 12 ounces
Gum arabic_____ 4 to 12 ounces
Water_____ 1 gallon This is not given by way of limitation, as the titanium dioxide may form any desired proportion of the mixture, but desirably from 30% upwards.

The titanium dioxide is in the coating as titanium dioxide, and not as a titanate. Because it is titanium dioxide, it has a melting point (1560° C.) which is higher than that of the metal of the electrode, which is most commonly a steel. This is found to be of considerable advantage in preventing the arc-distortion which tends to occur if a coating melts in advance of the steel base.

We claim as our invention:

1. A coated welding electrode which is substantially free from alkali metals and alkaline-earth metals and of which the coating contains at least 30% titanium dioxide.

2. A welding electrode having a coating which contains at least 30% titanium dioxide and also contains a binder which promotes adherence of the titanium dioxide to the wire and is substantially free from alkali metals and alkaline-earth metals.

3. A welding electrode having a coating containing at least 30% titanium dioxide and at least 25% gum arabic.

4. A welding electrode having a coating rich in a titanium compound which has a higher melting point than that of the wire which it coats, and poor in alkali metals and alkaline-earth metals.

5. A coated welding electrode which is substantially free from alkali metals and alkaline-earth metals and of which the coating contains at least 30% titanium dioxide.

6. A coated welding electrode of which the coating contains at least 30% titanium dioxide, and which contains not more than 10% as much of alkali metals and alkaline-earth metals as it does titanium dioxide.

7. A welding electrode having a coating containing at least 30% titanium dioxide, and gum arabic as a binder and as a source of a shielding carbonaceous gas, and relatively free from alkali metals and alkaline-earth metals.

8. A welding electrode, consisting of a metal core-wire which is so prepared that its surface is substantially free from alkali-metal and alkaline-earth-metal compounds; and a flux coating on said core wire, said coating containing at least 30% titanium dioxide and not more than 10% as much alkali metals and alkaline-earth metals as it does titanium dioxide.

9. The process of making a flux-coated electrode, which consists in drawing core-wire from a rod which has its surface substantially free from lime; and then coating such wire with a material containing at least 30% titanium dioxide and not more than 10% as much alkali metals and alkaline-earth metals as it does titanium dioxide.

10. The process of making a flux-coated electrode, which consists in meal-coating the rod and drawing a core-wire from the meal-coated rod; and then coating such wire with a material containing at least 30% titanium dioxide and not more than 10% as much alkali metals and alkaline-earth metals as it does titanium dioxide.

11. The process of making a flux-coated electrode, which consists in wet-drawing a core-wire from a substantially lime-free rod; and then coating such wire with a material containing at least 30% titanium dioxide and not more than 10% as much alkali metals and alkaline-earth metals as it does titanium dioxide.

PAUL R. JUDY.
HARRY R. PENNINGTON.